(12) United States Patent  
Dogra et al.

(10) Patent No.: US 9,147,261 B2  
(45) Date of Patent: Sep. 29, 2015

(54) VIDEO OBJECT TRACKING USING MULTI-PATH TRAJECTORY ANALYSIS

(71) Applicant: Samsung Electronics Co. Ltd., Suwon-si, Gyeonggi-do (KR)

(72) Inventors: Debi Prosad Dogra, Paschim Medinipur (IN); Saurabh Tyagi, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 14/077,886

(22) Filed: Nov. 12, 2013

(65) Prior Publication Data

US 2014/0133703 A1  May 15, 2014

(30) Foreign Application Priority Data

Nov. 11, 2012 (IN) .......................... 2845/DEL/2012

(51) Int. Cl.
*G06K 9/00* (2006.01)
*G06T 7/20* (2006.01)

(52) U.S. Cl.
CPC ..... *G06T 7/2026* (2013.01); *G06T 2207/10016* (2013.01); *G06T 2207/20021* (2013.01); *G06T 2207/20072* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,095,786 B1 * | 8/2006 | Schonfeld et al. | 375/240.16 |
| 2007/0268369 A1 * | 11/2007 | Amano et al. | 348/207.99 |
| 2009/0304234 A1 * | 12/2009 | Kondo et al. | 382/103 |
| 2010/0271484 A1 * | 10/2010 | Fishwick et al. | 348/169 |
| 2010/0281373 A1 * | 11/2010 | Pueyo et al. | 715/723 |

FOREIGN PATENT DOCUMENTS

JP  2009-076094  *  4/2009  .............. G06T 7/20

* cited by examiner

*Primary Examiner* — Amara Abdi
(74) *Attorney, Agent, or Firm* — Jefferson IP Law, LLP

(57) ABSTRACT

A method for obtaining trajectory of an object using multi-path tracking mode is provided. The method includes marking a portion of the object in a frame of a video, obtaining consecutive frames in the video, and tracking the marked portion of the object in consecutive frames by estimating sum of absolute difference. The method further includes comparing the sum of absolute difference to a sum of absolute difference threshold, switching between the multi-path tracking mode and single path tracking mode based on the comparison of the sum of absolute difference to the sum of absolute difference threshold, and obtaining trajectory of the marked portion by combining the single path tracking mode and multi-path tracking mode.

21 Claims, 9 Drawing Sheets

VIDEO OBJECT TRACKING USING MULTI-PATH TRAJECTORY ANALYSIS

CROSS-REFERENCE TO RELATED APPLICATION(S)

This application claims the benefit under 35 U.S.C. §119(a) of an India patent application filed on Nov. 11, 2012 in the Indian Intellectual Property Office and assigned Serial No. 2845/DEL/2012, the entire disclosure of which is hereby incorporated by reference.

TECHNICAL FIELD

The present disclosure relates to object tracking. More particularly, the present disclosure relates to an apparatus, method, and system for video object tracking using multi-path trajectory analysis.

BACKGROUND

Video object tracking is a well known method used in several computer vision-guided applications, such as security, monitoring, sports, traffic, healthcare, or the like. However, different applications have different requirements. For example, in traffic monitoring applications, tracking vehicles moving on highway may require analyzing fast moving objects of rectangular shape. Whereas in sports, tracking players and playing objects like football, tennis ball, basket ball, or the like may be desired. In surveillance applications, often objects are of unknown shape and restrictions on the movement of objects may not be applied. In such cases, tracking methods need to be robust with respect to environmental noise.

In an existing video object tracking method, a portion of an object is marked in first frame and the portion of the object that is marked is tracked in consecutive frames. A corresponding point that matches with the marked portion of the first frame within the consecutive frames is determined by minimizing the matching distance based on matching criteria. The matching criteria can be determined using information such as Sum of Absolute Differences (SAD) or sum of squared differences or any other application specific information.

In an existing block based object tracking method (single path tracking), a block representing a portion of an object is marked or detected in the first frame. A best match of the marked portion in the next frame is selected based on the minimum SAD criteria. Similarly, in each consecutive frame, the best match of the marked portion is selected and the trajectory of the block is obtained following the minimum SAD criteria. A disadvantage of the single path tracking method is that, certain errors exist while detecting the best block at each and every frame using the minimum SAD criteria. Such errors occur because of the similar color and pixel intensity of the neighboring blocks present within the frame and such errors will be cumulatively added while detecting the trajectory of the object. Even, if the best block is selected at every consecutive frame using the existing methodology, an optimal solution may not be achieved. The optimal solution may not be achieved because of the fact that the methods according to the related art depend heavily upon the success of the SAD or any other measure based inter-frame point correspondence technique. Such methods produce local maxima which may not achieve the global solution in all cases. Thus, the single path tracking method may not always achieve the optimal trajectory of the object being tracked.

In view of the above discussion, there is a need for a video object tracking method that reduces the error while detecting the minimum SAD in the single path tracking (e.g., best match criteria) to obtain the optimal trajectory of the object in a video stream.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system that provides a multi-path trajectory analysis for tracking objects in a video stream.

Another aspect of the present disclosure is to provide a method for switching between single path tracking mode and multi-path tracking mode for tracking objects in a video stream.

In accordance with an aspect of the present disclosure, a method for obtaining trajectory of an object using multi-path tracking mode is provided. The method includes marking a portion of the object in a frame of a video, obtaining consecutive frames in the video, tracking the marked portion of the object in consecutive frames by estimating sum of absolute difference, comparing the sum of absolute difference to a sum of absolute difference threshold, switching between said multi-path tracking mode and single path tracking mode based on the comparison of the sum of absolute difference to the sum of absolute difference threshold, and obtaining trajectory of the marked portion by combining the single path tracking mode and multi-path tracking mode.

In accordance with an aspect of the present disclosure, the marking of the portion of the object may further include dividing the frame into multiple blocks.

In accordance with an aspect of the present disclosure, the method may track the marked portion in the consecutive frame of the video when the sum of absolute difference of the multiple blocks is less than the threshold.

In accordance with an aspect of the present disclosure, the tracking of the marked portion of the object may include selecting a best block among the multiple blocks in the single path tracking mode.

In accordance with an aspect of the present disclosure, the method may switch to the multi-path tracking mode from the single path tracking mode when the sum of absolute difference of the plurality of blocks is greater than the the sum of absolute difference threshold and may assign a level upon switching into the multi-path tracking mode.

In accordance with an aspect of the present disclosure, the multi-path tracking mode terminates and the method switches to the single path tracking mode when said level reaches a maximum level.

In accordance with an aspect of the present disclosure, the multi-path tracking mode may further include selecting possible blocks among multiple blocks for the marked portion in the consecutive frame, and estimating the sum of absolute difference between the best possible blocks and the marked portion for selecting the best block.

In accordance with an aspect of the present disclosure, the method may select the best block for the marked portion among the best possible blocks based on minimum sum of absolute difference criteria. Furthermore, selecting the best block may include determining the sum of absolute difference of the best possible blocks. Furthermore, the method may increment the level after selecting the best block for the marked portion in the consecutive frame. Moreover, obtaining the trajectory may further include combining tracked results of the single path tracking mode and multi-path tracking mode.

In accordance with another aspect of the present disclosure, an electronic device configured to obtain a trajectory of an object using a multi-path tracking mode is provided. The electronic device includes a storage unit configured to store a video, and at least one control unit configured to mark a portion of the object in a frame of the video, to obtain consecutive frames in the video, to track the marked portion of the object in the consecutive frames, by estimating sum of absolute difference, to compare the sum of absolute difference to a sum of absolute difference threshold, to switch between the multi-path tracking mode and a single path tracking mode based on the comparison of the sum of absolute difference to the sum of absolute difference threshold, and to obtain a trajectory of the marked portion by combining the single path tracking mode and the multi-path tracking mode.

In accordance with another aspect of the present disclosure, the electronic device may include an input unit configured to receive an input from a user.

Other aspects advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
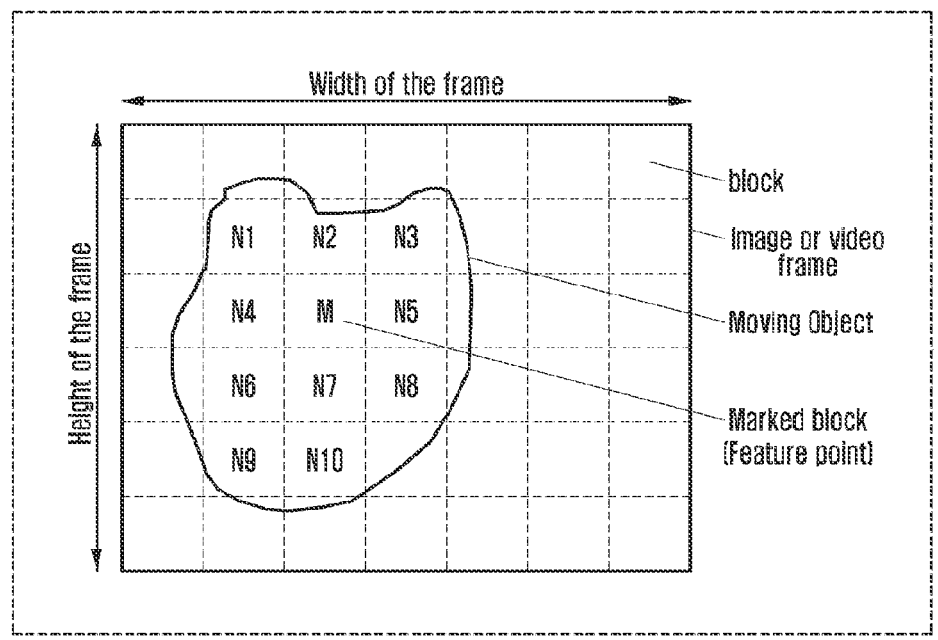
FIG. 1 illustrates a video frame with an object spanned in different blocks and feature point marked according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, an electronic device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like.

Various embodiments of the present disclosure described herein relate to a method and/or system for video object tracking using a multi-path analysis. According to various embodiments of the present disclosure, the marked point (feature point) is tracked in consecutive frames using both single path tracking and multi-path tracking modes. According to various embodiments of the present disclosure, the method considers multiple neighboring blocks of the feature point being tracked while obtaining the trajectory of the object. According to various embodiments of the present disclosure, the method provides a Sum of Absolute Differences (SAD) threshold (T) and select only K number of neighboring blocks when SAD with all of the neighboring blocks of the block representing the feature point is higher than T.

According to various embodiments of the present disclosure, the method includes switching between the single path tracking mode and the multi-path tracking mode based on the threshold (T). According to various embodiments of the present disclosure, the method includes entering the multi-path tracking mode from the single path tracking mode based on the threshold (T). According to various embodiments of the present disclosure, the method assigns a level (L) to define the maximum depth of the multi-path mode. Further, according to various embodiments of the present disclosure, the method terminates the multi-path tracking mode when L reaches a maximum allowable level ($L_{max}$) or the SAD value becomes less than the threshold (T). Finally, according to various embodiments of the present disclosure, the trajectory of the object is obtained by combining the tracking results of the single path tracking mode and the multi-path tracking mode.

Referring now to the drawings, and more particularly to FIGS. 1 to 9, where similar reference characters denote corresponding features consistently throughout the figures, there are shown various embodiments of the present disclosure.

FIG. 1 illustrates a video frame with an object spanned in different blocks and feature point marked according to an embodiment of the present disclosure.

Referring to FIG. 1, a video frame is illustrated. The video frame has multiple blocks, a moving object, and a marked block M. The marked block M represents the feature point which is tracked in consecutive frames. According to various embodiments of the present disclosure, the moving object may be assumed to span over multiple blocks of rectangular size. For example, as illustrated in the FIG. 1, the moving object can span over the multiple blocks (e.g., N1, N2, N3, N4, M, N5, N6, N7, N8, N9, and N10).

Figure 2:
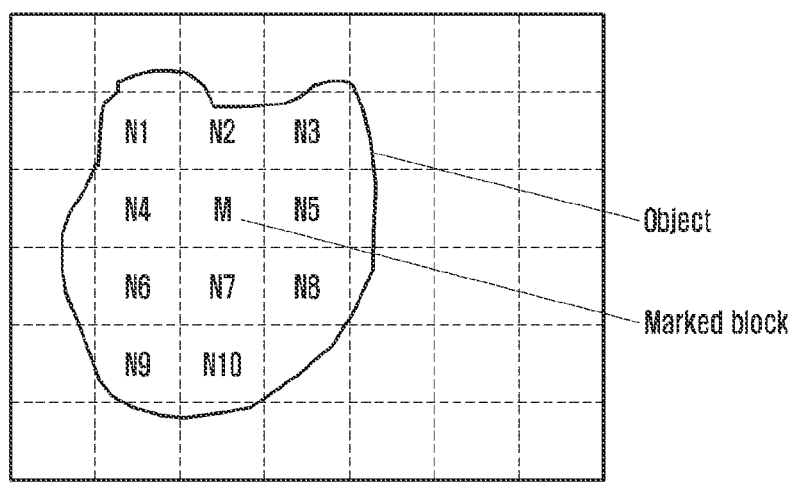
FIG. 2 illustrates a position of a moving object in different frames assuming that the object is moving with an unknown velocity and acceleration according to an embodiment of the present disclosure.
Figure 2:
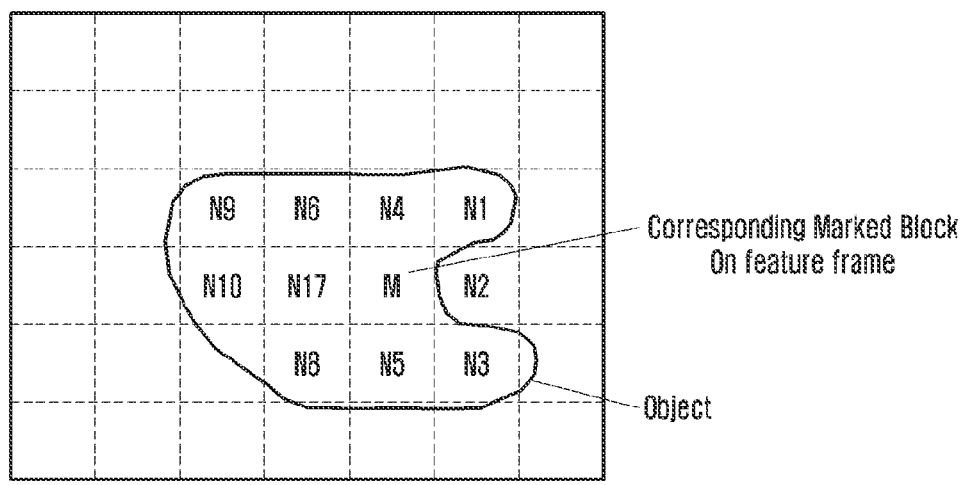

FIG. 2 illustrates a position of a moving object in different frames assuming that the object is moving with an unknown velocity and acceleration according to an embodiment of the present disclosure.

Referring to FIG. 2, the object in the current frame with marked block M (feature point) is tracked in the next consecutive frames, assuming that the moving object is of fixed size (rigid). The neighboring blocks of M (e.g., N1, N2, . . . N10) may be assumed to have similar color, intensity, and texture characteristics, which closely matches with the block M. Thus, tracking the movement of the feature point (block M) in the consecutive frames using single path mode may be difficult.

Figure 3:
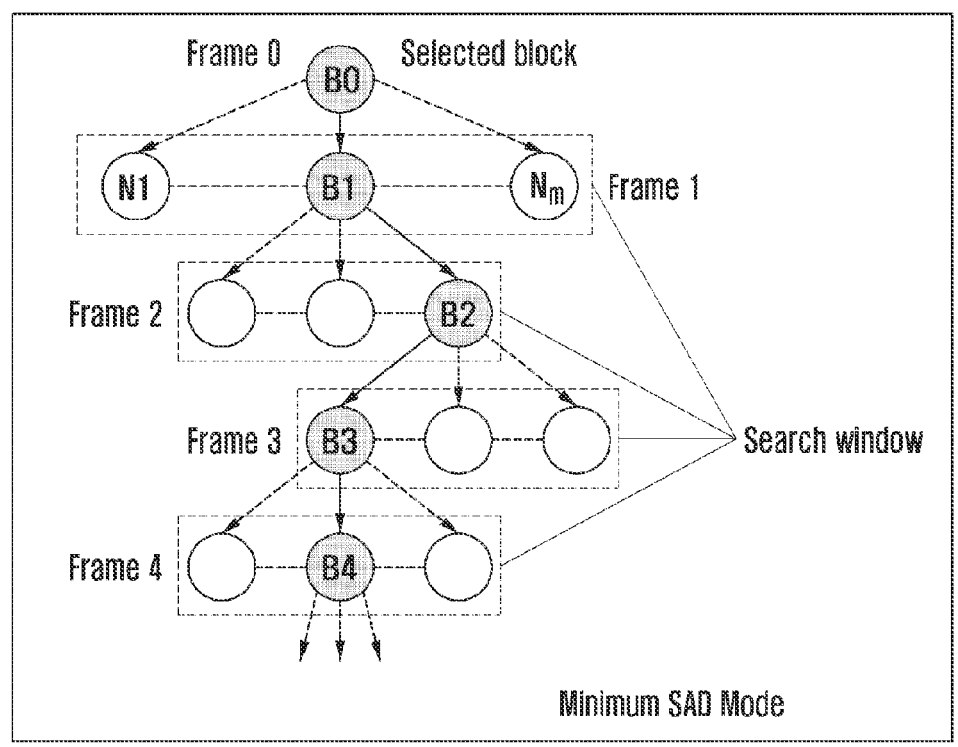
FIG. 3 illustrates a feature point selection and object tracking using minimum Sum of Absolute Differences (SAD) criteria according to an embodiment of the present disclosure.

FIG. 3 illustrates a feature point selection and object tracking using minimum SAD criteria according to an embodiment of the present disclosure.

Referring to FIG. 3, the existing method of object tracking, a block representing a part of an object is marked in the first frame by a user. For example, the best block among the multiple blocks is selected based on the minimum SAD criteria in the next frame. Similarly, in each consecutive frame, the best block among the blocks is selected based on the minimum SAD criteria. The hierarchical representation can be in the form of a tree, which is formed during the selection of the best block for each consecutive frame (as illustrated in FIG. 3). The highlighted circles represent the trajectory of the block, which can be selected or marked by the user in the first frame.

As illustrated in FIG. 3, the block selected as corresponding to the best block according to the minimum SAD criteria in the next frame corresponds to block B1 in Frame 1, block B2 in Frame 2, block B3 in Frame 3, and block B4 in Frame 4.

Figure 4:
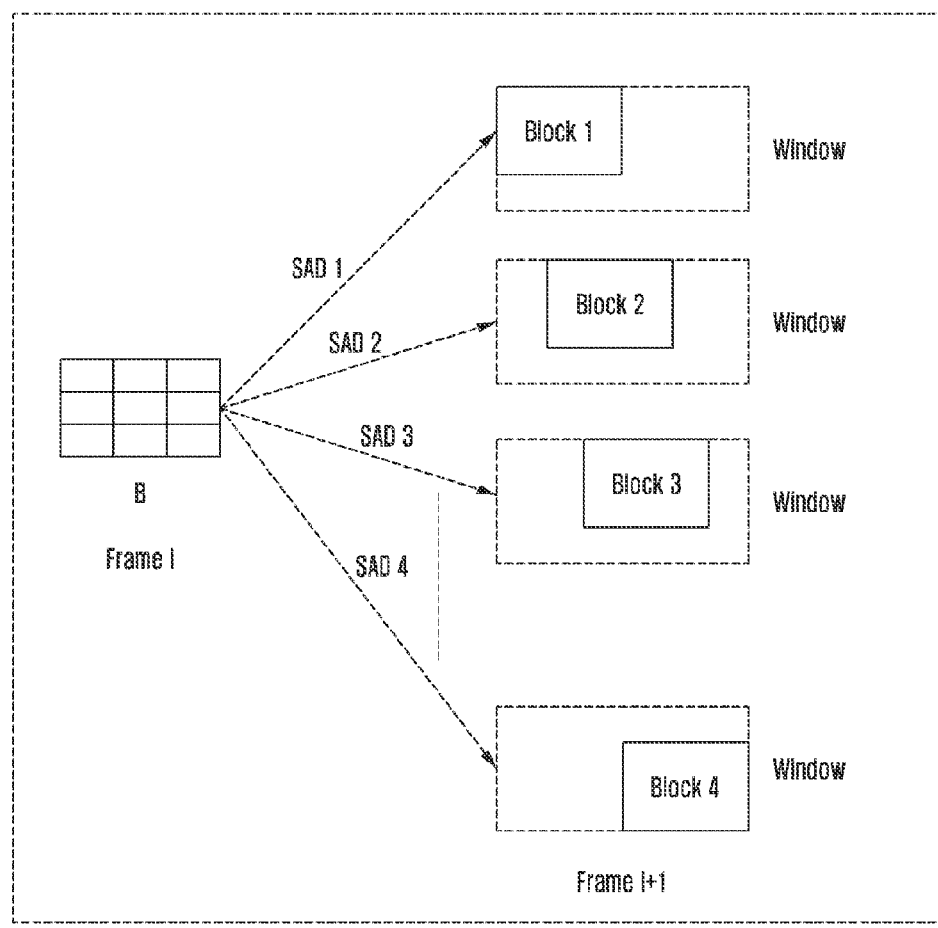
FIG. 4 illustrates estimation of SAD and inter-frame block association according to an embodiment of the present disclosure.

FIG. 4 illustrates an estimation of SAD and inter-frame block association according to an embodiment of the present disclosure.

Referring to FIG. 4, a block B represents a portion of the object being tracked in a frame 'i'. The SAD can be estimated between the block B and neighboring blocks inside a predefined window. For example, the SAD can be estimated between the block B and neighboring blocks inside a selected window. The SAD is computed using equation 1, where $X \in \{BLOCK_1, BLOCK_2 \ldots BLOCK_M\}$ and each block is of the dimension n1 X n2.

$$SAD(B, X) = \sum_{m=0}^{n_1-1} \sum_{n=0}^{n_2-1} |B(m, n) - X(m, n)| \quad (1)$$

According to the related art, Kalman filter based trajectory refinement methods may be used to correct measurement error in the SAD. For example, the Kalman filter based trajectory refinement methods use predefined motion model to correct the measurement error in the SAD. For example, at each consecutive frame, the measurement is updated by using the filter. The Kalman filter based trajectory refinement methods according to the related art usually explore single path. However, situations may exist when the Kalman filter based single path analysis may fail. For example, as explained in relation to FIG. 1, if the neighboring blocks include similar statistics, then the single path analysis may not achieve an optimal trajectory. In such situations, instead of following local maxima, a better estimation following global or semi-global maxima can be suggested.

Figure 5:
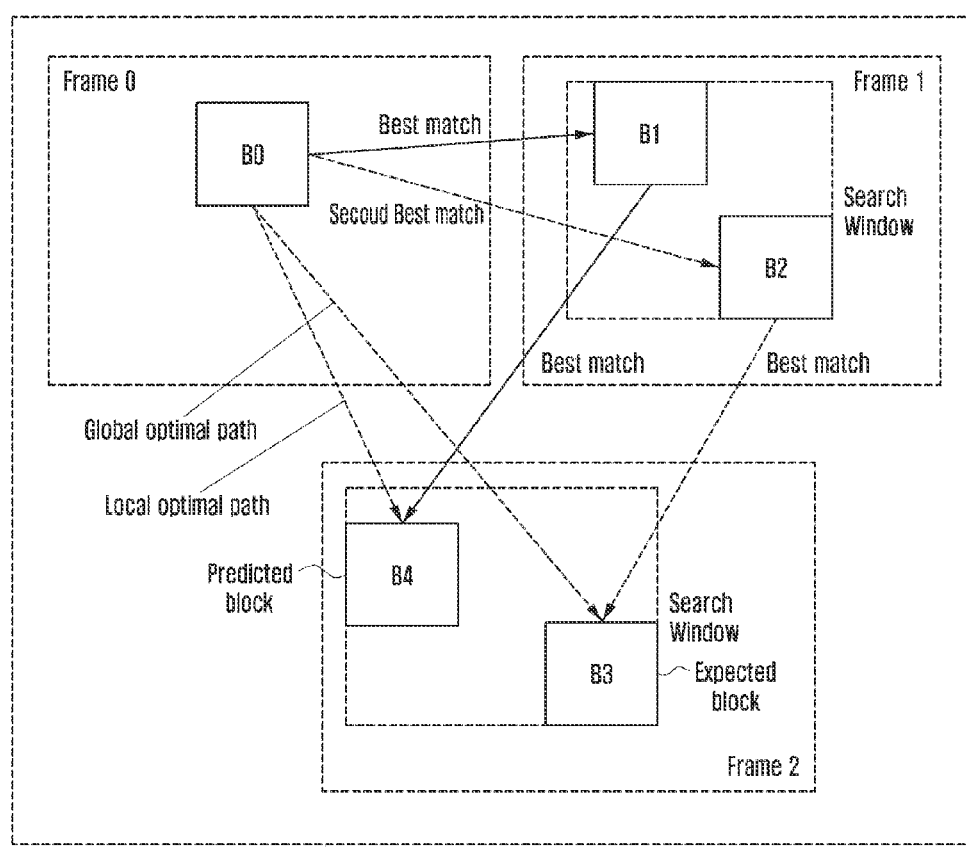
FIG. 5 illustrates a single path tracking method according to an embodiment of the present disclosure.

FIG. 5 illustrates a single path tracking method according to an embodiment of the present disclosure.

Referring to FIG. 5, consecutive frames namely frame 0, frame 1, and frame 2 of a video stream are illustrated. In an example, a user marks a block B0 in the frame 0 which needs to be tracked in the next consecutive frames by using the minimum SAD based criteria. The single path tracking method tracks the marked object as described below.

As illustrated in FIG. 5, the best match for the block B0 is searched in the next frame. In a typical scenario, single path tracking method may select the block B1 as the best choice according to the minimum SAD criterion and the block B2 may not be selected as only one output is considered. In this case, it may be possible that in the next frame, the SAD estimated between the blocks B3 and B0 becomes lowest among all. However, as B2 is ignored in the previous frame, the method does not consider B3 in the computation of the final path. In an example, though the B0 does not include the global optimal SAD, B4 gets selected as B4 is linked through B1. Further, the block B3 may move outside the search window due to fast movement of the object. In such situations, there is no scope to compute SAD between the block B1 and B3 in the second frame. Thus, the best match criteria may not always achieve the optimal trajectory.

Figure 6:
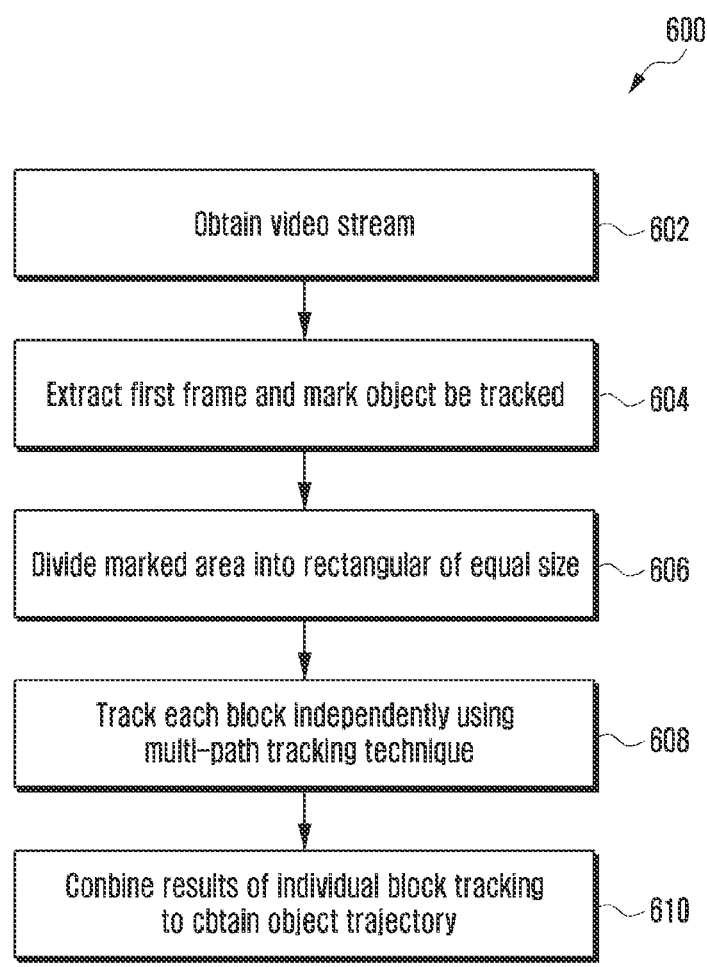
FIG. 6 illustrates a flow diagram describing a method for tracking an object using multi-path tracking according to various embodiments of the present disclosure.

FIG. 6 illustrates a flow diagram describing a method 600 for tracking an object using multi-path tracking according to various embodiments of the present disclosure.

Referring to FIG. 6, at operation 602, a video stream is obtained by the user. In an example, the video stream described herein can include multiple image frames with one or more objects. The object can appear in each of the image frames of the video stream. The object can include different scale and/or orientation in each of the image frames. The image frames of the video stream may be obtained by using a video camera and such image frames may be stored for analysis and tracking of the object.

At operation 602, the first frame of the video stream is extracted and the object is identified. According to various embodiments of the present disclosure, the object may be identified manually by a user. According to various embodiments of the present disclosure, the object may be identified automatically using an object detection technique and a portion of object in the first frame of the video stream is marked. This marked portion is considered as a feature point which is tracked in the successive frames of the video stream.

At operation 606, the marked area or the portion of the object is divided into rectangular blocks of equal sizes. The marked portion in the identified object is divided into object segments. For example, the identified object is divided into overlapping object segments to maintain coherence between the adjacent object segments.

At operation 608, the trajectory of each independent block is tracked using multi-path tracking technique.

At operation 610, the results of each individual block tracked are combined to obtain the trajectory of the marked portion in the first frame of the video stream.

According to various embodiments of the present disclosure, the various operations described with respect to FIG. 6 may be performed in the order presented, in a different order, or simultaneously. Further, according to various embodiments of the present disclosure, some operations listed in the FIG. 6 may be omitted or added without deviating from the scope of the present disclosure.

Figure 7:
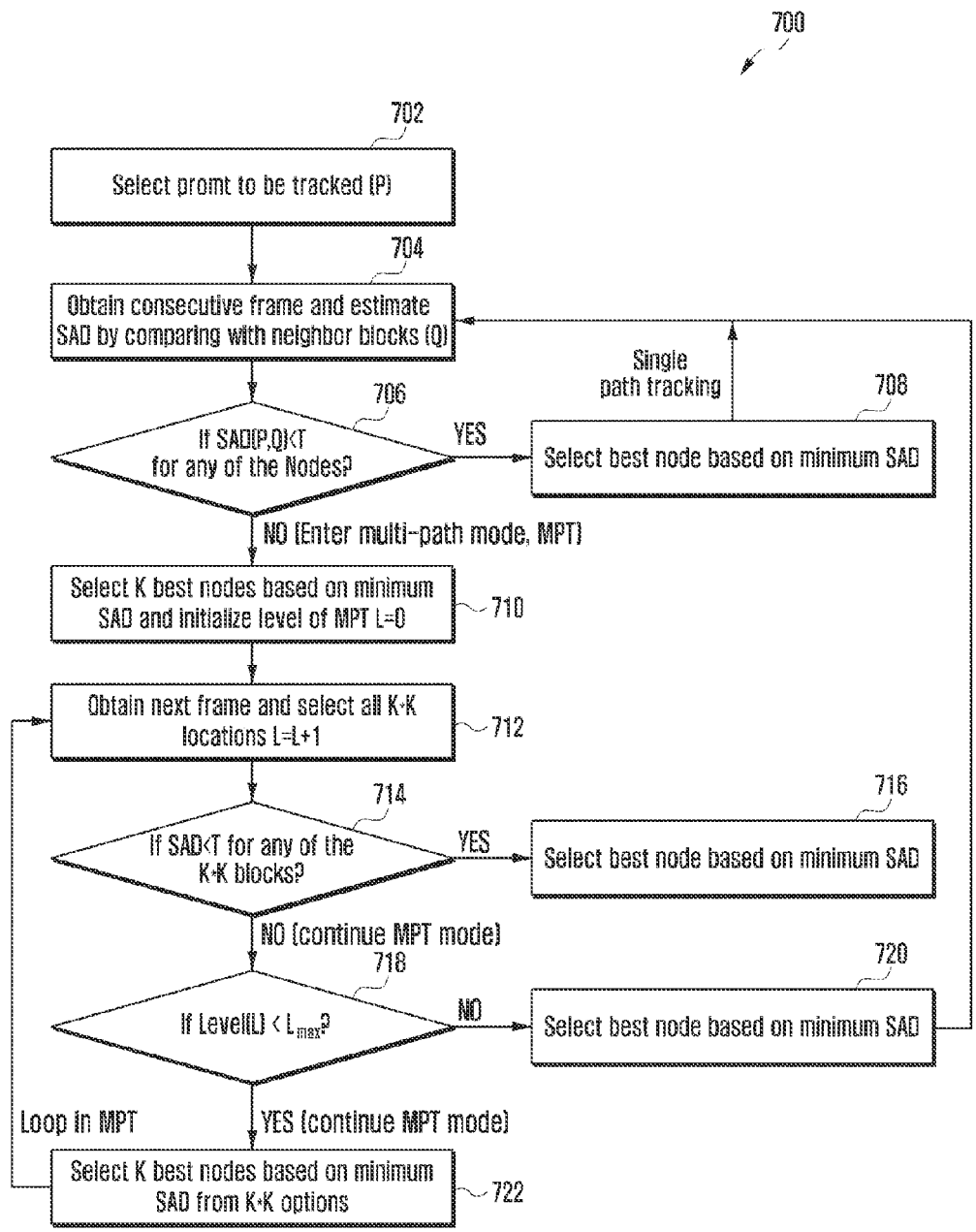
FIG. 7 illustrates a flow diagram describing a method for a multi-path tracking according to various embodiments of the present disclosure.

FIG. 7 illustrates a flow diagram describing a method 700 for a multi-path tracking according to various embodiments of the present disclosure.

Referring to FIG. 7, an example is described in which the point P denotes the center of the block representing a marked portion of the object to be tracked in the first frame of the video and $L_{max}$ denotes the maximum permissible level in Multi-Oath Tracking mode (MPT).

At operation 702, the method 700 includes selecting a point (P) of the object that is to be tracked in the successive frames of the video stream.

At operation 704, the method 700 includes obtaining the consecutive frames of the video stream and estimating the SAD by comparing the point (P) with all of the neighboring blocks (Q).

At operation 706, the method 700 includes determining whether SAD (P, Q)<T for all of the neighboring blocks of marked Portion (P) in the consecutive frame.

If the SAD is determined to be less than the Threshold (T) for all of the neighboring blocks in the consecutive frame of the video stream at operation 706, the method 700 proceeds to operation 708 at which the method 700 includes selecting the best neighboring block (Q) that has minimum SAD in the consecutive frame by using the single path tracking.

If the SAD is determined to be greater than the Threshold (T) (e.g., if SAD (P, Q)>T), then the method 700 proceeds to operation 710 at which the method 700 includes selecting the K best blocks (which are neighboring nodes of a node) before entering into MPT mode. Further, the MPT level (L) is assigned to zero during the initial phase of the MPT mode, which indicates the current depth of the tree inside the MPT mode.

At operation 712, during the MPT mode execution, the method 700 includes obtaining the consecutive frame of the video stream, selecting, all the K*K blocks, and increasing the level (L).

At operation 714, the method 700 includes determining whether the SAD<T for any of the K*K blocks.

If the SAD is determined to be less than the Threshold (T) (e.g., if the SAD<T) for any of the K*K blocks at operation 714, then the method 700 proceeds to operation 716 at which the method 700 includes selecting the best block based on the minimum SAD.

In contrast, if the SAD is determined to be greater than the Threshold (T) (e.g., if the SAD>T) for all the K*K blocks at operation 714, then the method 700 proceeds to operation 718 at which the MPT mode is repeated by incrementing the level (L).

Further, at operation 718, the method 700 includes determining whether the number of levels (L) in the MPT has reached a threshold value ($L_{max}$) defined by the user.

If the number of levels (L) in the MPT is determined to have not reached the threshold value $L_{max}$ (e.g., if the level (L)<$L_{max}$), then the method 700 proceeds to operation 712 and the MPT mode is repeated.

At operation 722, the method 700 includes selecting the K best blocks based on the minimum SAD from the K*K blocks. Further, the method 700 includes repeating operation 712 for continuing in the multi-path mode.

In contrast, if the number of levels (L) in the MPT is determined to have reached the threshold value $L_{max}$ (e.g., once the level (L) reaches the threshold level ($L_{max}$) defined by the user) at operation 718, the method 700 proceeds to operation 720 at which the method 700 includes switching to the single point tracking mode and selecting the best block based on the minimum SAD.

According to various embodiments of the present disclosure, the various operations described with respect to the FIG. 7 may be performed in the order presented, in a different order, or simultaneously. Further, according to various embodiments of the present disclosure, some of the operations listed in the FIG. 7 may be omitted or added without departing from the scope of the present disclosure.

According to various embodiments of the present disclosure, in the MPT mode, the system and method assigns an initial level (L) zero and increments the level (L) in consecutive frames. The execution of the multi-path tracking method is explained with an example herein.

Consider an object with a center P, which is marked by the user for tracking in the consecutive frames of a video stream. Let $L_{max}$ denote the highest permissible level in the multi-path tracking mode. Initially, the next frame of the video stream is obtained and the surrounding window of the object is searched for a probable matching. Further, whether the SAD of the block P with neighboring blocks (Q) is less than a threshold value (T) is determined. The threshold (T) can be defined by the user empirically. If the (SAD<T), then the best neighboring blocks among Q blocks by SAD criteria is obtained using single path tracking. According to various embodiments of the present disclosure, the SAD criteria is the same as finding the SAD between the blocks and repeating the same operations until the condition (SAD<T) holds true. Once the method finds that the (SAD<T) is not true, then the method can enter into the multi-path tracking mode for obtaining the trajectory of the object.

In the multi-path mode, assume a level (L) is assigned to zero and a parameter "K" is defined, which represents the number of nodes to be searched for obtaining the best possible match and these "K" nodes represent the neighboring nodes of the node reached in the single path tracking mode. Let S={S1, S2 ... SK} represents the set of K best possible nodes that are the neighboring nodes of a node, which are reached in the single path tracking mode. Further, the method obtains the next frame of the video stream and initiates a search around the K locations corresponding to the blocks in S. For every element of the set S, the K best possibilities are selected from the list of nested nodes. Thus, a set of $K^2$ possible locations are found. This set can be represented by Mij=[{M11, M12 . . . , M1K}, {M21, M22, . . . M2K}, . . . {MK1, MK2, . . . MKK}.

Thereafter, the method determines whether the SAD (Si, Mij)<T for any 1=i<k and 1<j<K. If the SAD (Si, Mij)<T for any 1=i<k and 1<j<K condition is true, then the method selects the Mij, which include minimum SAD with parent Si thereof and switches to the single path tracking.

Further, if level (L) is less than the $L_{max}$ (e.g., defined empirically by the user), then the method selects K best blocks (according to the minimum SAD criteria) from the list Mij and increment "L" value for repeating the multi-path tracking mode. Once the level (L) reaches the $L_{max}$ (e.g., defined empirically by the user), then the method switches to the single point tracking mode.

Figure 8:
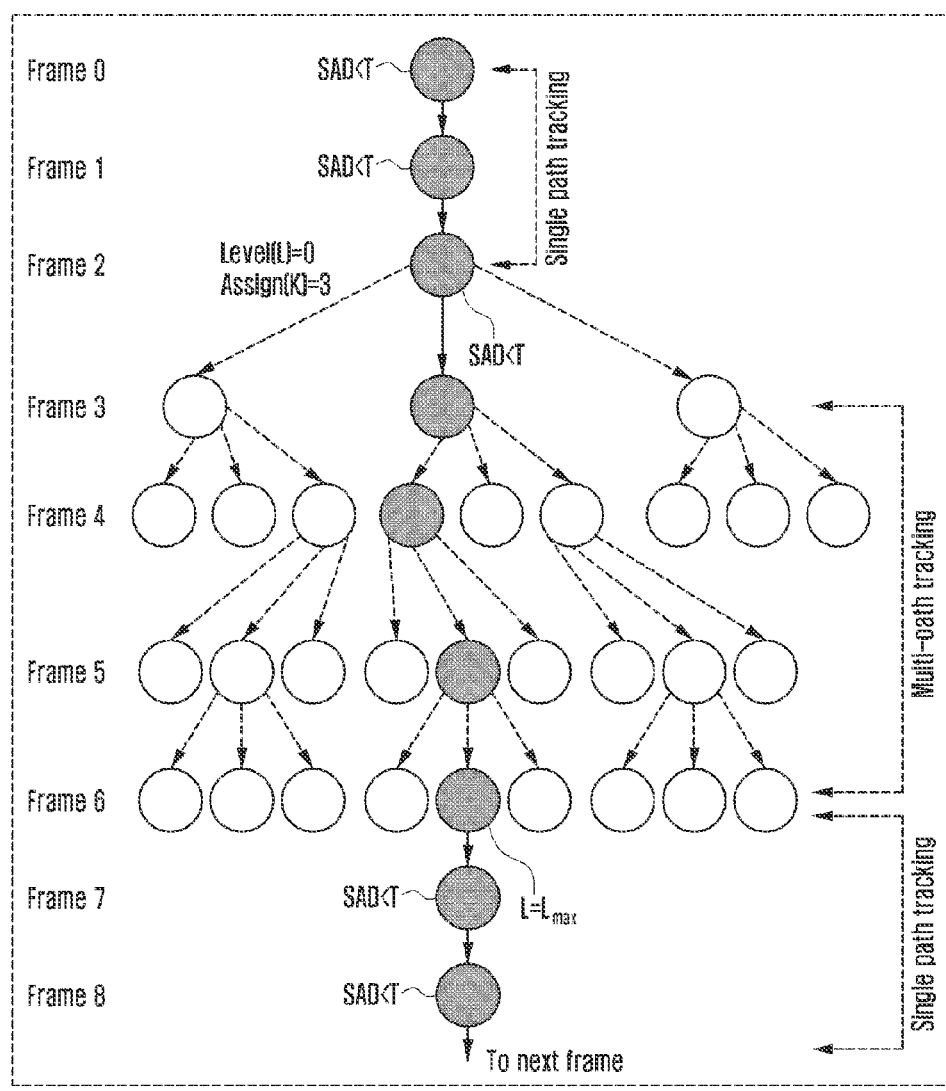
FIG. 8 illustrates a tree representation of an object tracking according to various embodiments of the present disclosure.

FIG. 8 illustrates a tree representation of an object tracking according to various embodiments of the present disclosure.

Referring to FIG. 8, the movement of the object is tracked by using both the single path tracking mode and multi-path tracking mode for obtaining the trajectory of the object in consecutive frames of a video stream. FIG. 8 illustrates the trajectory of the marked object in a frame 0. The trajectory of the object is obtained by tracking the movement of the object from the frame 0 to frame 8 using the single path tracking and multi-path tracking modes.

When the SAD is less than the threshold value (T) (e.g., which is defined by the user), then the method follows the single path tracking mode. Further, when SAD is greater than the threshold value (T), method enters into the multi-path tracking mode and increments the level (L) accordingly to obtain the trajectory of the object. According to various embodiments of the present disclosure, the method includes switching between these two modes depending on the parameters. The parameters according to which the method may switch between the single-path tracking mode and the multi-path tracking mode can be the maximum allowable level ($L_{max}$) and the SAD threshold (T).

Once the maximum allowable level ($L_{max}$) in the MPT mode is reached, the method automatically switches back to the single path tracking mode. Further, when the SAD is less than the threshold (T), the method executes single path tracking mode and when the SAD crosses the threshold limit (T), the method automatically switches into the multi-path tracking mode. The maximum allowable level ($L_{max}$) and the SAD threshold (T) are defined and can be customized by the user based on the tracking requirements.

According to various embodiments of the present disclosure, the multi-path tracking method can be used in various mobile based applications. For example, the multi-path tracking method can be applied to augmented reality applications in which motion based analysis is required to fetch the data of a moving object. Similarly, the method can be applied in mobile healthcare in which doctors and physicians can use such efficient tracking methodology to track movement of interesting objects. In addition, the method may be applied in remote or home surveillance using mobile devices. According to various embodiments of the present disclosure, the multi-path tracking methods are fast and accurate tracking methods.

The computational performance of the multi-path tracking method is described herein. An estimation of approximate number of nodes being processed during a complete execution of the disclosed method has been carried out. The computational performance of the multi-path tracking method is described under the assumption that a video stream includes N number of frames and the level of MPT is $L_{max}$. In the worst case scenario, the tracking method may run in the MPT mode during the entire duration of the video stream. Thus, there will be a maximum of $N/L_{max}$ ($N \gg L_{max}$) number of calls to the MPT function. Assuming that each of the MPT is explored up to the highest level $L_{max}$ thereof, in such a scenario, total number of nodes being processed is estimated to be N/Lmax* $(K^{Lmax-1}-1)/(K-1)$, which runs in O $(NK^{Lmax-1})$ time, where K is the number of paths being explored inside the MPT. If the method runs in the single path mode for the entire duration of the video stream, then only N number of nodes needs to be processed.

Figure 9:
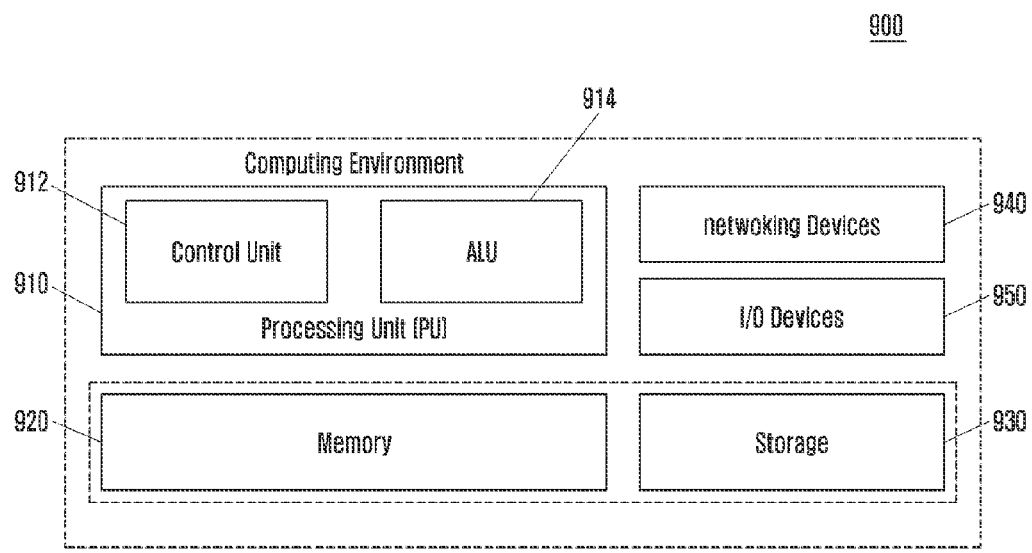
FIG. 9 illustrates a computing environment implementing an application according to various embodiments of the present disclosure.

FIG. 9 illustrates a computing environment implementing an application according to an embodiment of the present disclosure.

Referring to FIG. 9, the computing environment 900 comprises at least one processing unit 910 that is equipped with a control unit 912 and an Arithmetic Logic Unit (ALU) 914, a memory 920, a storage unit 930, plurality of networking devices 940, and a plurality Input Output (I/O) devices 950. The processing unit 910 is responsible for processing the instructions of the algorithm. The processing unit 910 receives commands from the control unit 912 in order to perform processing. Further, any logical and arithmetic operations involved in the execution of the instructions are computed with the help of the ALU 914. The processing unit 910 can support more than one thread.

The overall computing environment 900 can be composed of multiple homogeneous and/or heterogeneous cores, multiple GPUs of different kinds, special media and other accelerators. The processing unit 910 is responsible for processing the instructions of the algorithm. The processing unit 910 receives commands from the control unit 912 in order to perform processing. Further, any logical and arithmetic operations involved in the execution of the instructions are computed with the help of the ALU 914. The computing environment 900 may include a plurality of processing units. Further, the plurality of processing units may be located on a single chip or over multiple chips.

The instructions and codes required for the implementation are stored in either the memory unit or the storage or both. At the time of execution, the instructions may be fetched from the corresponding memory and/or storage, and executed by the processing unit.

In case of any hardware implementations various networking devices or external I/O devices may be connected to the computing environment to support the implementation through the networking unit and the I/O device unit.

The various embodiments disclosed herein can be implemented through at least one software program running on at least one hardware device and performing network management functions to control the elements. The elements illustrated in FIG. 9 include blocks which can be at least one of a hardware device, or a combination of hardware device and software module.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for obtaining trajectory of an object using a multi-path tracking mode, the method comprising:
    marking a portion of the object in a frame of a video;
    obtaining consecutive frames in the video;
    tracking the marked portion of the object in the consecutive frames, by estimating sum of absolute difference;
    comparing the sum of absolute difference to a sum of absolute difference threshold;
    switching between the multi-path tracking mode and a single path tracking mode based on the comparison of the sum of absolute difference to the sum of absolute difference threshold; and
    obtaining trajectory of the marked portion by combining the single path tracking mode and the multi-path tracking mode.

2. The method of claim 1, wherein the marking of the portion of the object further comprises:
    dividing the frame into a plurality of blocks.

3. The method of claim 1, wherein the method tracks the marked portion in the consecutive frame of the video, when the sum of absolute difference of the plurality of blocks is less than the threshold.

4. The method of claim 1, wherein the tracking of the marked portion of the object further comprises:
    selecting a best block among the plurality of blocks in the single path tracking mode.

5. The method of claim 1, wherein the method switches to the multi-path tracking mode from the single path tracking mode when the sum of absolute difference of the plurality of blocks is greater than the sum of absolute difference threshold and assigns a level upon switching into the multi-path tracking mode, and
    wherein the multi-path tracking mode terminates and the method switches to the single path tracking mode when the level reaches a maximum level.

6. The method of claim 1, wherein the method in the multi-path tracking mode further comprises:
    selecting possible blocks among the plurality of blocks for the marked portion in the consecutive frame; and
    estimating the sum of absolute difference between the best possible blocks and the marked portion for selecting the best block.

7. The method of claim 6, wherein the method selects the best block for the marked portion among the best possible blocks based on a minimum sum of absolute difference criteria.

8. The method of claim 7, wherein selecting of the best possible blocks further comprises:
    determining whether the sum of absolute difference of the best possible blocks are less than the threshold level.

9. The method of claim 8, wherein the method increments the level after selecting the best block for the marked portion in the consecutive frame.

10. The method of claim 1, wherein the obtaining of the trajectory further comprises:
    combining tracked results of the single path tracking mode and the multi-path tracking mode.

11. A non-transitory computer-readable storage medium storing instructions that, when executed, cause at least one processor to perform the method of claim 1.

12. An electronic device configured to obtain a trajectory of an object using a multi-path tracking mode, the electronic device comprising:
    a storage unit configured to store a video; and
    at least one control unit configured to mark a portion of the object in a frame of the video, to obtain consecutive frames in the video, to track the marked portion of the object in the consecutive frames, by estimating sum of absolute difference, to compare the sum of absolute difference to a sum of absolute difference threshold, to switch between the multi-path tracking mode and a single path tracking mode based on the comparison of the sum of absolute difference to the sum of absolute difference threshold, and to obtain a trajectory of the marked portion by combining the single path tracking mode and the multi-path tracking mode.

13. The electronic device of claim 12, wherein the at least one control unit is further configured to divide the frame into a plurality of blocks.

14. The electronic device of claim 12, wherein the at least one control unit is further configured to track the marked portion in the consecutive frame of the video, when the sum of absolute difference of the plurality of blocks is less than the threshold.

15. The electronic device of claim 12, wherein the at least one control unit is further configured to select a best block among the plurality of blocks in the single path tracking mode.

16. The electronic device of claim 12, wherein the at least one control unit is further configured to switch to the multi-path tracking mode from the single path tracking mode when the sum of absolute difference of the plurality of blocks is greater than the sum of absolute difference threshold, to assign a level upon switching into the multi-path tracking mode, and to terminate the multi-path tracking mode and to switch to the single path tracking mode when the level reaches a maximum level.

17. The electronic device of claim 12, wherein the at least one control unit is further configured to select possible blocks among the plurality of blocks for the marked portion in the consecutive frame, and to estimate the sum of absolute difference between the best possible blocks and the marked portion for selecting the best block.

18. The electronic device of claim 17, wherein the at least one control unit is further configured to select the best block for the marked portion among the best possible blocks based on a minimum sum of absolute difference criteria.

19. The electronic device of claim 18, wherein the at least one control unit is further configured to determine whether the sum of absolute difference of the best possible blocks are less than the threshold level.

20. The electronic device of claim 19, wherein the at least one control unit is further configured to increment the level after selecting the best block for the marked portion in the consecutive frame.

21. The electronic device of claim 12, wherein the at least one control unit is further configured to combine tracked results of the single path tracking mode and the multi-path tracking mode.

* * * * *